(12) United States Patent
Orlov et al.

(10) Patent No.: US 11,787,426 B2
(45) Date of Patent: Oct. 17, 2023

(54) CONTROL SYSTEM FOR A MOTOR VEHICLE HAVING A FIRST CONTROL DEVICE AND A SECOND CONTROL DEVICE TO CONTROL FIRST AND SECOND FUNCTIONS OF THE MOTOR VEHICLE AND METHOD FOR CONTROLLING A MOTOR VEHICLE

(71) Applicant: HELLA GMBH & CO KGAA, Lippstadt (DE)

(72) Inventors: Sergey Orlov, Paderborn (DE); Carsten Kuegeler, Lippstadt (DE); Ulrich Koehler, Lippstadt (DE); Peter Grabs, Wuerzburg (DE); Matthias Korte, Wuerzburg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 555 days.

(21) Appl. No.: 16/778,900

(22) Filed: Jan. 31, 2020

(65) Prior Publication Data
US 2020/0164893 A1 May 28, 2020

Related U.S. Application Data

(63) Continuation of application No. PCT/EP2018/069240, filed on Jul. 16, 2018.

(30) Foreign Application Priority Data

Jul. 31, 2017 (DE) .......................... 102017117297.1

(51) Int. Cl.
*B60W 50/029* (2012.01)
*B60T 8/88* (2006.01)
(Continued)

(52) U.S. Cl.
CPC .......... *B60W 50/029* (2013.01); *B60T 8/885* (2013.01); *B60W 10/18* (2013.01); *B60W 10/20* (2013.01);
(Continued)

(58) Field of Classification Search
CPC ........................... B60W 50/029; B60W 30/18
See application file for complete search history.

(56) References Cited

U.S. PATENT DOCUMENTS 9,880,911 B2   1/2018  Poledna
11,299,049 B2 * 4/2022  Linehan ............... H02J 1/06
(Continued)

FOREIGN PATENT DOCUMENTS

DE   102006062300 A1   10/2008
DE   102014200071 A1    9/2014
(Continued)

OTHER PUBLICATIONS

International Search Report dated Sep. 28, 2018 in corresponding application PCT/EP2018/069240.

*Primary Examiner* — Jess Whittington

(74) *Attorney, Agent, or Firm* — Muncy, Geissler, Olds & Lowe, P.C.

(57) ABSTRACT

A control system for a motor vehicle, having a first control device for controlling a first function of the motor vehicle and a second control device for controlling a second function of the motor vehicle. The first and second control (Continued)

devices are each in a signal transmission connection with at least one sensor and/or at least one actuator. To ensure the proper execution of functions of a motor vehicle controlled by control devices even with a faulty control device with the least possible effort, it is provided that in dependence on the receipt of an error signal from the first control device or the second control device, the respective error-free control device is configured such that the function of the motor vehicle that corresponds to the faulty control device is controlled by the error-free control device.

8 Claims, 2 Drawing Sheets

(51) Int. Cl.
*B60W 10/18* (2012.01)
*B60W 10/20* (2006.01)

(52) U.S. Cl.
CPC ..... *B60T 2260/02* (2013.01); *B60T 2270/413* (2013.01); *B60W 2050/0292* (2013.01)

(56) References Cited

U.S. PATENT DOCUMENTS

| | | | |
|---|---|---|---|
| 2008/0205416 A1* | 8/2008 | DeChiara | H04L 12/40013 370/465 |
| 2011/0241862 A1* | 10/2011 | Debouk | B60W 60/0018 340/439 |
| 2015/0012166 A1* | 1/2015 | Hauler | G05D 1/0268 701/23 |
| 2016/0231796 A1* | 8/2016 | Wade | G06F 1/266 |
| 2016/0250944 A1* | 9/2016 | Christ | B60L 58/15 701/22 |
| 2017/0010618 A1* | 1/2017 | Shashua | G01C 21/3602 |
| 2018/0229738 A1* | 8/2018 | Nilsson | B60W 50/0205 |
| 2018/0273005 A1 | 9/2018 | Redder et al. | |
| 2019/0220454 A1* | 7/2019 | Matsui | H04L 12/46 |

FOREIGN PATENT DOCUMENTS

| | | |
|---|---|---|
| DE | 102014213171 A1 | 10/2015 |
| FR | 2843341 A1 | 2/2004 |
| WO | WO2011032586 A1 | 3/2011 |
| WO | WO2014138767 A1 | 9/2014 |
| WO | WO2017058707 A1 | 4/2017 |

* cited by examiner

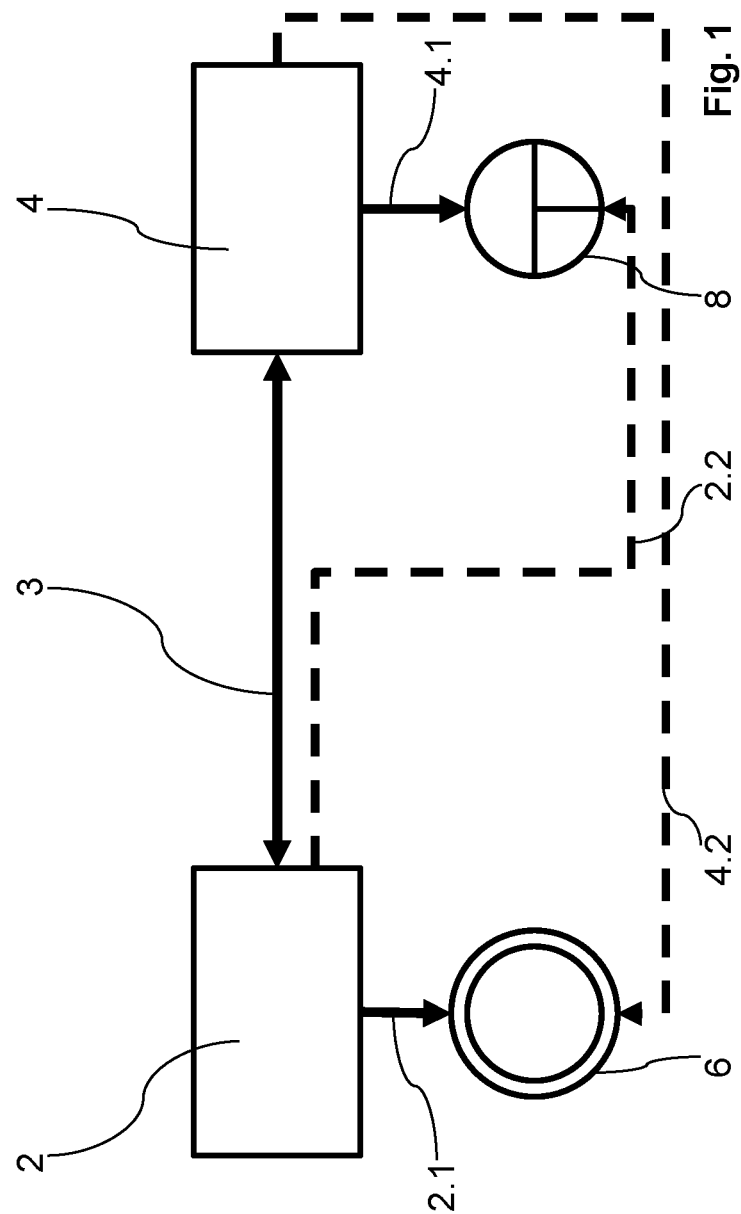

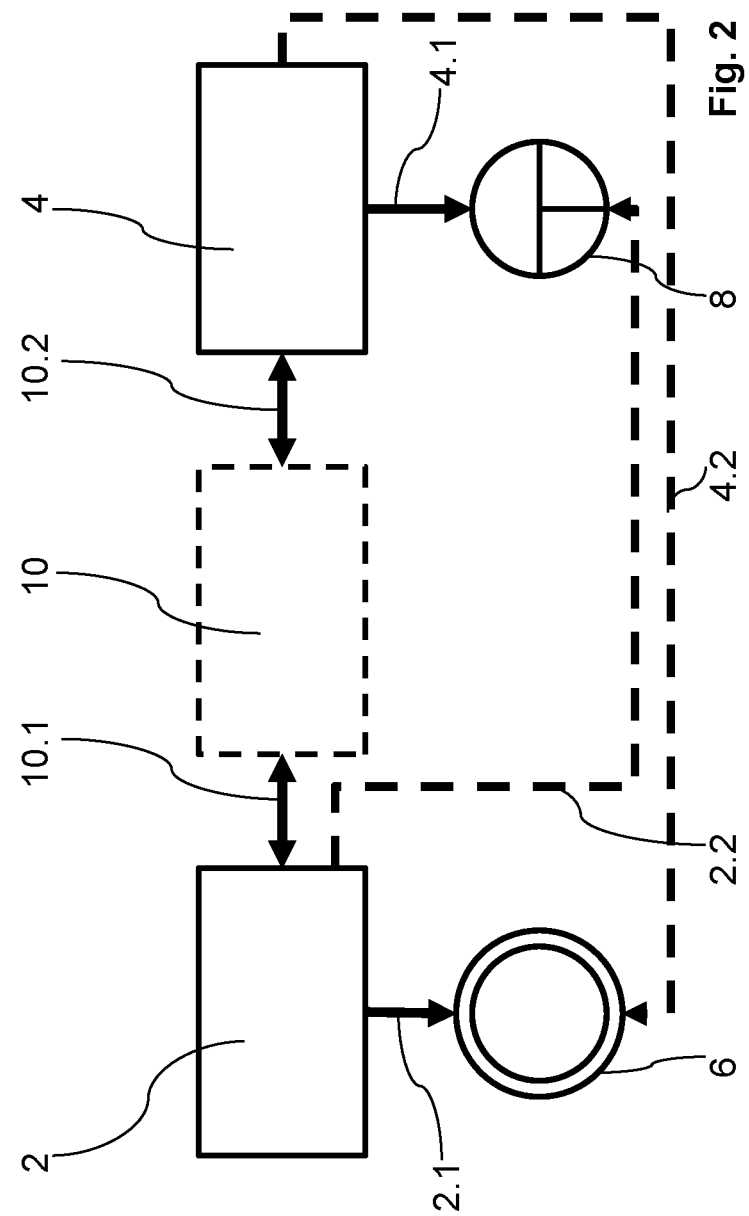

CONTROL SYSTEM FOR A MOTOR VEHICLE HAVING A FIRST CONTROL DEVICE AND A SECOND CONTROL DEVICE TO CONTROL FIRST AND SECOND FUNCTIONS OF THE MOTOR VEHICLE AND METHOD FOR CONTROLLING A MOTOR VEHICLE

This nonprovisional application is a continuation of International Application No. PCT/EP2018/069240, which was filed on Jul. 16, 2018, and which claims priority to German Patent Application No. 10 2017 117 297.1, which was filed in Germany on Jul. 31, 2017, and which are both herein incorporated by reference.

BACKGROUND OF THE INVENTION

Field of the Invention

The present invention relates to a control system for a motor vehicle, a motor vehicle, a method for controlling a motor vehicle, a computer program product and a computer-readable medium.

Description of the Background Art

Control systems for motor vehicles, motor vehicles, methods for controlling motor vehicles, computer program products and computer-readable media are already known from the prior art in numerous embodiments.

For example, a control system for a motor vehicle is known from FR 2 843 341 B1, which has a first control device designed as a brake control device for controlling a first function of the motor vehicle designed as a braking function, a second control device designed as a steering control device for controlling a second function of the motor vehicle designed as a steering function and a reserve control device designed as a central control device, wherein the brake control device and the steering control device are each in a signal transmission connection with at least one sensor and/or at least one actuator and wherein the brake control device is in a signal transmission connection with the central control device. In the event the brake control device fails, emergency braking is initiated and controlled by the central control device.

SUMMARY OF THE INVENTION

It is therefore an object of the present invention to ensure the proper execution of functions of a motor vehicle that are controlled via control devices even if the control device is faulty with as little additional effort as possible.

An advantage of the invention is, in particular, that functions of a motor vehicle which are different from one another and are controlled by means of control devices can also be safely carried out with as little additional effort as possible in the event that one of the control devices fails. In this case, at least two functions of the motor vehicle which are different from one another and are each controlled by a control device are carried out in the event that one of the two control devices fails, without a reserve control device having to be made available for both control devices. Accordingly, it is possible to reduce space, weight and costs. This is very important especially in modern motor vehicles with a high degree of electric and electronically functionality, i.e. with a large number of functions that are controlled by means of control devices.

Instead of direct signal transmission connections, indirect signal transmission connections are also conceivable.

For example, an indirect signal transmission connection would also be understood to mean that in the event of failure, the first and/or second control device forwards an error message by means of a signal transmission connection to a higher-level control device, and the higher-level control device then generates a corresponding output signal and transmits this to the error-free control device or the third control device. Thus, the output signal of the higher-level control device leads to a configuration of the error-free control device in such a way that by means of the error-free control device, the function of the motor vehicle corresponding to the faulty control device can be controlled. The same applies to the method according to the invention, according to which the error-free control device controls the function of the motor vehicle that corresponds to the faulty control device, depending on the output signal of the higher-level control device. The higher-level control device can be, for example, a central control device.

According to the invention, the term "control device" can to be understood in general terms and refers to any type of electrical or electronic device for the automatic control of a function in a motor vehicle.

For example, the first function of the motor vehicle controlled by a first control device and the second function of the motor vehicle controlled by a second control device can be freely selected within wide suitable limits. A particularly advantageous further development provides, however, that the first function of the motor vehicle is designed as a braking function of the motor vehicle and the second function of the motor vehicle is designed as a steering function of the motor vehicle. In this case, these are key and safety-related functions of the motor vehicle, the proper execution of which is especially important in highly automated or autonomous vehicles.

Highly automated or autonomous vehicles are motor vehicles in which the vehicle driver, if at all, only performs a certain supervisory role. Thus, highly automated or autonomous motor vehicles are designed and set up to participate in road traffic essentially independent of the intervention of a vehicle driver. The vehicle driver is more a passenger than a decision-maker who determines the functions of the motor vehicle.

However, the term "autonomous" can be interpreted broadly, so that it encompasses various degrees of autonomous driving and autonomous motor vehicles. For example, situation-dependent autonomous driving and thus situation-dependent autonomous motor vehicles are mentioned here in which, depending on the traffic situation and/or the driving maneuver to be performed, autonomous driving takes place or not. Correspondingly, alternatively, one can also speak of automated driving and automated motor vehicles.

The same applies analogously to the advantageous development of the method according to the invention, according to which the first function of the motor vehicle is a braking function of the motor vehicle and the second function of the motor vehicle is a steering function of the motor vehicle.

A further advantageous development of the control system according to the invention provides that the control system comprises a user interface and can be converted from a deactivated state to an activated state depending on the presence of an activation signal at the user interface, wherein in the deactivated state of the control system, the error-free control device does not control the function of the motor vehicle that corresponds to the faulty control device independently of the input of the error signal in the error-free control device or the third control device, and in the activated state of the control system, controls the function of the motor vehicle corresponding to the faulty control device depending on the input of the error signal in the error-free control device or the third control device. This makes it possible to equip vehicles with the inventive control system at a time when autonomous vehicles and functions associated therewith are not yet permissible. In the event of a later change in the law, it is then possible with little effort to switch the motor vehicle to autonomous driving and thus to an inventive control system in its activated state.

This is of an advantage if laws differ in different countries, for example, with regard to the admissibility of autonomous motor vehicles. According to the aforementioned refinement, it is possible to develop, produce and distribute a unified model of motor vehicle in terms of the components relevant to the invention despite different legal provisions in the individual countries.

The same applies to the further refinement of the method according to the invention for controlling a motor vehicle, according to which the control system has a user interface and, depending on the presence of an activation signal at the user interface, is converted from a deactivated state to an activated state, wherein in the deactivated state of the control system the error-free control device does not control the function of the motor vehicle that corresponds to the faulty control device independently of the input of the error signal at the error-free control device or the third control device, and in the activated state of the control system, controls the function of the motor vehicle that corresponds to the faulty control device dependent on the input of the error signal with the error-free control device or the third control device.

Another advantageous development of the method according to the invention provides that the error-free control device is configured in such a way that it performs the function of the motor vehicle that corresponds to the faulty control device in a manner which is restricted as compared to normal operation of this function, or that it performs the function of the motor vehicle that corresponds to the error-free control device in a way that is restricted as compared to normal operation of this function. In this way, the effort involved in implementing the method according to the invention is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates a control system according to an exemplary embodiment of the invention for a motor vehicle; and FIG. 2 illustrates a control system according to an exemplary embodiment invention for a motor vehicle.

DETAILED DESCRIPTION

FIG. 1 shows an exemplary embodiment of an inventive control system for a motor vehicle. The control system has a first control device 2 for a first function and a second control device 4 for a second function of a motor vehicle (not shown in more detail). The motor vehicle is designed as a highly automated motor vehicle in which the functions of the motor vehicle are selected and carried out substantially automatically by the motor vehicle.

The first function is designed as a braking function and the second function is designed as a steering function of the motor vehicle. Accordingly, the first control device 2 controls the braking function of the motor vehicle and the second control device 4 controls the steering function of the motor vehicle. The first control device 2 for controlling the braking function of the motor vehicle is in a signal transmission connection with first actuators 6 of the motor vehicle embodied as brakes and the second control device 4 is in a signal transmission connection with a second actuator 8 embodied as a steering device of the motor vehicle.

In other applications, the braking function and/or the steering function could be a different number of actuators. Depending on the individual case, the person skilled in the art will select and determine the appropriate selection and number of actuators for the respective function of the motor vehicle.

The respective signal transmission connection between the first control device 2 and the brakes 6 as well as the second control device 4 and the steering 8 is symbolized in FIG. 1 by means of continuous arrows 2.1 and 4.1. The brakes 6 and the steering 8 of the motor vehicle are safety-relevant and therefore very important functions of the motor vehicle. This applies to an even greater extent to the selected exemplary embodiment, which is an autonomous motor vehicle.

So that in the event that one of the control devices 2 and 4 fails the braking function and the steering function of the motor vehicle can be properly and thus safely executed, the first control device 2 and the second control device 4 are in a signal transmission connection with one another, which is symbolized in FIG. 1 by the double arrow 3. At the same time, the first control device 2 is also in a signal transmission connection with the steering 8 and the second control device 4 is also in a signal transmission connection with the brakes 6. This is symbolized by the dashed arrows 2.2 and 4.2.

In the following, the method according to the invention is explained in more detail using FIG. 1.

In normal operation of the control system according to the invention for the autonomous motor vehicle, the brakes 6 are controlled by means of the first control device 2 for the braking function of the motor vehicle and the steering 8 by means of the second control device 4 for the steering function of the motor vehicle. In the first control device 2 or in the second control device 4 or in a control device 2, 4 superordinate to the respective control device, the need for brake intervention by the first control device 2 or steering intervention by the second control device 4 is determined in a manner known to the person skilled in the art on the basis of input signals of sensors of the motor vehicle applied to the corresponding control device. Both a possible higher-level control device and the sensors of the motor vehicle are not shown in FIG. 1.

In the above-described normal operation of the control system according to the invention in accordance with the present exemplary embodiment, the first control device 2 does not intervene in the steering function and the second control device 4 does not intervene in the braking function of the motor vehicle. By means of the signal transmission connection 3 existing between the first control device 2 and the second control device 4, the first control device 2 monitors the proper functioning of the second control device 4 and the second control device 4 the proper functioning of the first control device 2. In the event that one of the two control devices 2 and 4 fails, a corresponding error signal from the faulty control device 2 or 4 is present at the respective error-free control device 2, 4 as an input signal.

If, for example, the first control device 2 is defective, so that the brakes 6 controlled therewith are no longer properly controlled and the braking function of the motor vehicle would therefore no longer be carried out safely, this error is reported to the second control device 4 by means of the signal transmission connection 3, whereupon the second control device 4 is configured such that it controls the braking function of the motor vehicle, i.e., controls the function of the motor vehicle that corresponds to the faulty first control device 2. For this purpose, the second control device 4 is in signal exchange by means of the signal transmission connection 4.2 with the brakes 6 of the motor vehicle. Thus, in the event the first control device 2 fails, the brakes 6 are no longer controlled by the first control device 2 but rather by the second control device 4.

The same applies analogously if the second control device 4 is defective. In this case, the first control device 2 receives a corresponding error message regarding the second control device 4 by means of the signal transmission connection 3, whereupon the first control device 2 is configured such that it controls the steering function of the motor vehicle. The steering 8 is therefore no longer controlled by the faulty second control device 4, but instead by the first control device 2, specifically by means of the signal transmission connection 2.2.

FIG. 2 shows an exemplary embodiment. In the following, only the differences to the first exemplary embodiment are explained. Otherwise, reference is made to the description of the first exemplary embodiment. The same or equivalent components are provided with the same reference numerals.

In contrast to the first exemplary embodiment, the second exemplary embodiment has, in addition to the first and second control devices 2, 4, a third control device 10. The third control device 10 is designed as a central control device 10 of the motor vehicle, not shown. The central control device 10 is in a signal transmission connection with the first control device 2 as well as the second control device 4. In FIG. 2, the signal transmission connection between the central control device 10 and the first control device 2 is symbolized by a double arrow 10.1 and the signal transmission connection between the central control device 10 and the second control device 4 is symbolized by a double arrow 10.2.

By means of the signal transmission connections 10.1 and 10.2, the central control device 10 monitors the proper functioning of the first control device 2 and the proper functioning of the second control device 4. In the event that one of the two control devices 2 and 4 fails, a corresponding error signal from the faulty control device 2 or 4 is present at the central control device 10 as an input signal. If, for example, the first control device 2 malfunctions, so that the thus controlled brakes 6 are no longer properly controlled and thus the braking function of the motor vehicle is no longer safely executed, this error is reported to the central control device 10 by means of the signal transmission connection 10.1, whereupon the second control device 4, in signal exchange with the central control device 10 by means of the signal transmission connection 10.2, is configured such that this controls the braking function of the motor vehicle, i.e., controls the function of the motor vehicle that corresponds to the faulty first control device 2. To this end, the second control device 4 is in signal exchange by means of the signal transmission connection 4.2 with the brakes 6 of the motor vehicle. In the event that the first control device 2 fails, the brakes 6 are no longer controlled by the first control device 2 but instead by the second control device 4.

The same applies analogously if the second control device 4 malfunctions. In this case, the central control device 10 receives a corresponding error message with respect to the second control device 4 by means of the signal transmission connection 10.2, whereupon the first control device 2, which is in signal exchange with the central control device 10 by means of the signal transmission connection 10.1, is configured such that this controls the steering function of the motor vehicle. The steering 8 is therefore no longer controlled by the faulty second control device 4, but rather by the first control device 2, specifically by means of the signal transmission connection 2.2.

The invention is not limited to the present exemplary embodiments. For example, it is conceivable that the control system has a user interface and, depending on the presence of an activation signal at the user interface, can be converted from an deactivated state to an activated state, wherein in the deactivated state of the control system, the error-free control device does not control the function of the motor vehicle that corresponds to the faulty control device independent of the input of the error signal at the error-free control device or the third control device and, in the activated state of the control system, controls the function of the motor vehicle that corresponds to the faulty control device depending on the input of the error signal at the error-free control device or the third control device.

The control system according to the invention for a motor vehicle would in this case be present and deactivated in a motor vehicle and could be activated for future use by means of operator intervention by a vehicle driver, repair shop staff or the like. The same applies analogously to the method according to the invention for controlling a motor vehicle.

In addition, autonomous motor vehicles may not be legally approved in some countries. In the event of a later change in the law, the motor vehicle prepared in accordance with the invention can then be switched to autonomous driving with little effort and thus be switched to using a control system according to the invention and to using a method according to the invention for controlling the motor vehicle in its activated state.

For example, it would be conceivable that the error-free control device controls a rather subordinate function of the motor vehicle during normal operation of the motor vehicle. Should an error occur, the error-free control device could be configured such that in the event of failure, it controls the function of the defective control device instead of the subordinate function. This could, as in the exemplary embodiment, involve the braking function or the steering function of the motor vehicle.

In other embodiments of the invention, for example in peer functions of the motor vehicle, however, it would also be conceivable that the error-free control device controls the function corresponding to the faulty control device in addition to the function corresponding to the error-free control device in its normal operation.

Furthermore, the error-free control device could control the function of the faulty control device in a type of emergency mode. The reverse case is also fundamentally conceivable, namely that in the event of failure, the error-free control device controls the function assigned to said control device in its normal operation in a kind of emergency mode in favor of the function of the faulty control device.

The invention is not limited to the braking function and steering function of a motor vehicle. The invention is advantageously applicable also to other functions of a motor vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control system for a motor vehicle, the control system comprising:
    a first control device to control a braking function of the motor vehicle; and
    a second control device to control a steering function of the motor vehicle,
    wherein the first control device is in a signal transmission connection with at least one first sensor and at least one first actuator to communicate with the at least one first sensor and the at least one first actuator in order to control the braking function of the motor vehicle and the second control device is in a signal transmission connection with at least one second sensor and at least one second actuator to communicate with the at least one second sensor and the at least one second actuator in order to control the steering function of the motor vehicle,
    wherein the first control device and the second control device are in a signal transmission connection to communicate with each other or the first and second control devices are each in a signal transmission connection with a third control device to communicate with each other via the third control device,
    wherein when an error signal from the first control device, indicating that the first control device is a faulty control device, is input in the second control device that is error-free or is input in the third control device, the second control device that is error-free is configured to actuate the at least one first actuator to control the braking function of the motor vehicle,
    wherein when an error signal from the second control device, indicating that the second control device is a faulty control device, is input in the first control device that is error free or is input in the third control device, the first control device that is error free is configured to actuate the at least one second actuator to control the steering function of the motor vehicle,
    wherein in order for the first control device to control the steering function when the second control device is the faulty control device, the first control device is in a signal transmission connection with the at least one second sensor and the at least one second actuator to communicate with the at least one second sensor and the at least one second actuator and in order for the second control device to control the braking function when the first control device is the faulty control device, the second control device is in a signal transmission connection with the at least one first sensor and the at least one first actuator to communicate with the at least one first sensor and the at least one first actuator, and
    wherein the control system has a user interface and, depending on the presence of an activation signal at the user interface, is converted from a deactivated state to an activated state, wherein in the deactivated state of the control system the first control device or the second control device that is error-free does not control the braking or steering function of the motor vehicle that corresponds to the faulty control device when the error signal is input in the first control device or the second control device that is error-free or when the error signal is input in the third control device, and in the activated state of the control system, the first control device or the second control device that is error free controls the braking or steering function of the motor vehicle that corresponds to the faulty control device when the error signal is input in the first control device or the second control device that is error-free or when the error signal is input in the third control device.

2. A motor vehicle comprising:
    the control system according to claim 1 with the first control device for controlling the braking function of the motor vehicle and with the second control device for controlling the steering function of the motor vehicle,
    wherein the first and the second control devices are each connected with the at least one first sensor, the at least one first actuator, the at least one second sensor and the at least one second actuator.

3. The control system according to claim 1, wherein in a fault-free operation of the control system, the first control device solely controls the braking function and the second control device solely controls the steering function.

4. A method for controlling a motor vehicle, the method comprising:
    providing a first control device for controlling a braking function of the motor vehicle; and
    providing a second control device for controlling a steering function of the motor vehicle,
    wherein the first control device is in a signal transmission connection with at least one first sensor and at least one first actuator to communicate with the at least one first sensor and the at least one first actuator in order to control the braking function of the motor vehicle and the second control device is in a signal transmission connection with at least one second sensor and at least one second actuator to communicate with the at least one second sensor and the at least one second actuator in order to control the steering function of the motor vehicle,
    wherein the first control device and the second control device are in a signal transmission connection to communicate with each other or the first and second control devices are each in a signal transmission connection with a third control device to communicate with each other via the third control device,
    wherein when an error signal from the first control device, indicating that the first control device is a faulty control device, is input in the second control device that is error-free or is input in the third control device, the second control device that is error-free is configured to actuate the at least one first actuator to control the braking function of the motor vehicle,
    wherein when an error signal from the second control device, indicating that the second control device is a faulty control device, is input in the first control device that is error free or is input in the third control device, the first control device that is error free is configured to actuate the at least one second actuator to control the steering function of the motor vehicle, wherein in order for the first control device to control the steering function when the second control device is the faulty control device, the first control device is in a signal transmission connection with the at least one second sensor and the at least one second actuator to communicate with the at least one second sensor and the at least one second actuator and in order for the second control device to control the braking function when the first control device is the faulty control device, the second control device is in a signal transmission connection with the at least one first sensor and the at least one first actuator to communicate with the at least one first sensor and the at least one first actuator, and wherein the control system has a user interface and, depending on the presence of an activation signal at the user interface, is converted from a deactivated state to an activated state, wherein in the deactivated state of the control system the first control device or the second control device that is error-free does not control the braking or steering function of the motor vehicle that corresponds to the faulty control device when the error signal is input in the first control device or the second control device that is error-free or when the error signal is input in the third control device, and in the activated state of the control system, the first control device or the second control device that is error free controls the braking or steering function of the motor vehicle that corresponds to the faulty control device when the error signal is input in the first control device or the second control device that is error-free or when the error signal is input in the third control device.

5. The method according to claim 4, wherein the first control device or the second control device that is error-free is configured to perform the braking or steering function of the motor vehicle that corresponds to the faulty control device in a way that is restricted as compared to normal operation of the braking or steering function, or is configured to perform the braking or steering function of the motor vehicle that corresponds to the first control device or the second control device that is error-free in a way that is restricted as compared to normal operation of the braking or steering function.

6. The method according to claim 4, wherein in a fault-free operation of the control system, the first control device solely controls the braking function and the second control device solely controls the steering function.

7. A non-transitory computer-readable medium storing a computer program thereon that, when executed by a control system, causes the control system to:
control a first control device of the motor vehicle to provide a braking function of the motor vehicle, the first control device being in a signal transmission connection with at least one first sensor and at least one first actuator to communicate with the at least one first sensor and the at least one first actuator in order to control the braking function of the motor vehicle; and
control a second control device of the motor vehicle to provide a steering function of the motor vehicle, the second control device being in a signal transmission connection with at least one second sensor and at least one second actuator to communicate with the at least one second sensor and the at least one second actuator in order to control the steering function of the motor vehicle, wherein the first control device and the second control device are in a signal transmission connection to communicate with each other or the first and second control devices are each in a signal transmission connection with a third control device to communicate with each other via the third control device, wherein when an error signal from the first control device, indicating that the first control device is a faulty control device, is input in the second control device that is error-free or is input in the third control device, the second control device that is error-free is configured to actuate the at least one first actuator to control the braking function of the motor vehicle, wherein when an error signal from the second control device, indicating that the second control device is a faulty control device, is input in the first control device that is error free or is input in the third control device, the first control device that is error free is configured to actuate the at least one second actuator to control the steering function of the motor vehicle, wherein in order for the first control device to control the steering function when the second control device is the faulty control device, the first control device is in a signal transmission connection with the at least one second sensor and the at least one second actuator to communicate with the at least one second sensor and the at least one second actuator and in order for the second control device to control the braking function when the first control device is the faulty control device, the second control device is in a signal transmission connection with the at least one first sensor and the at least one first actuator to communicate with the at least one first sensor and the at least one first actuator, and wherein the control system has a user interface and, depending on the presence of an activation signal at the user interface, is converted from a deactivated state to an activated state, wherein in the deactivated state of the control system the first control device or the second control device that is error-free does not control the braking or steering function of the motor vehicle that corresponds to the faulty control device when the error signal is input in the first control device or the second control device that is error-free or when the error signal is input in the third control device, and in the activated state of the control system, the first control device or the second control device that is error free controls the braking or steering function of the motor vehicle that corresponds to the faulty control device when the error signal is input in the first control device or the second control device that is error-free or when the error signal is input in the third control device.

8. The non-transitory computer readable medium according to claim 7, wherein in a fault-free operation of the control system, the first control device solely controls the braking function and the second control device solely controls the steering function.

* * * * *